Figure 1:
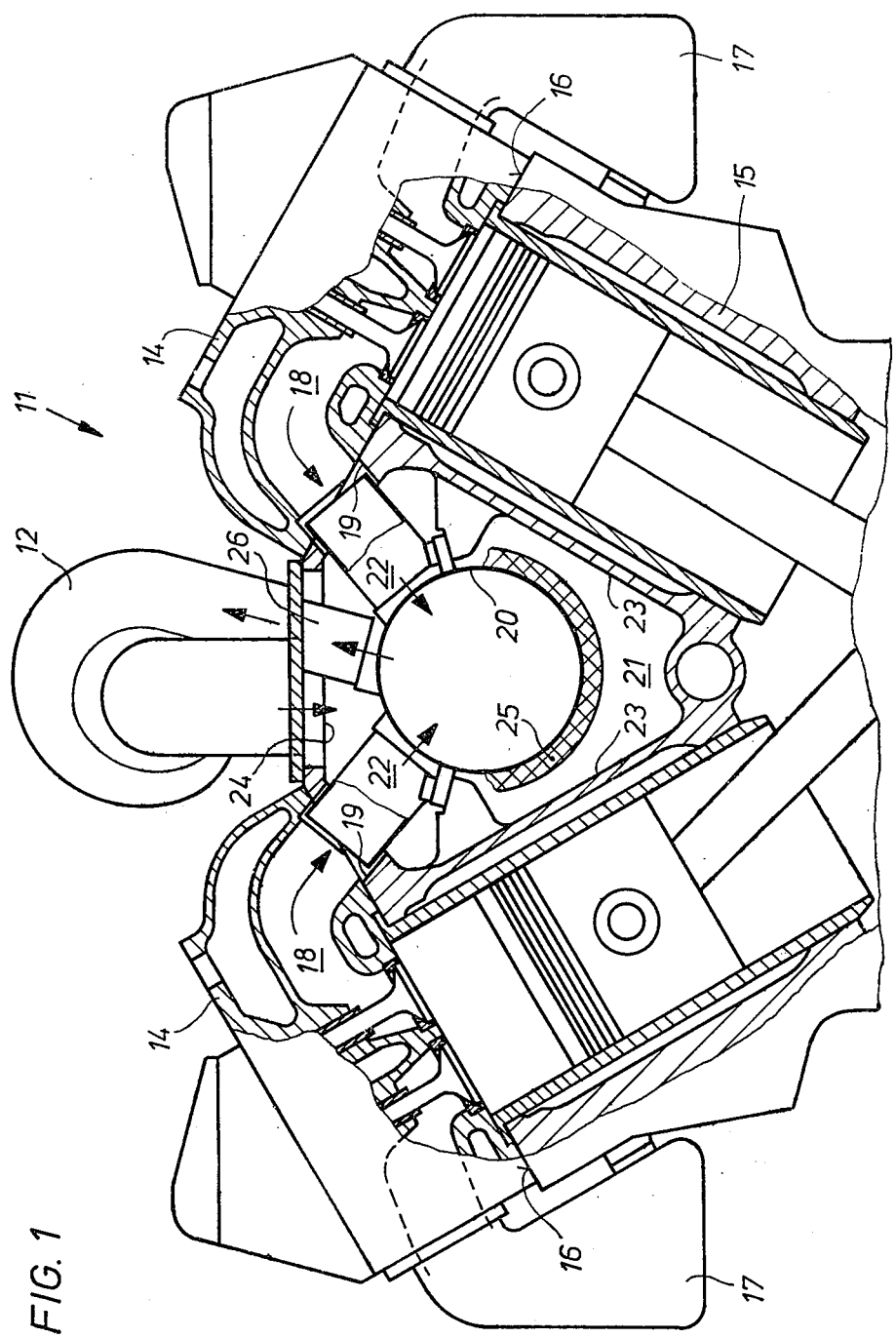

United States Patent [19]

Deutschmann

[11] Patent Number: 4,458,491

[45] Date of Patent: Jul. 10, 1984

[54] SUPERCHARGED RECIPROCATING INTERNAL COMBUSTION ENGINE

[75] Inventor: Herbert Deutschmann, Friedrischshafen, Fed. Rep. of Germany

[73] Assignee: MTU-Motoren-und Turbinen-Union Friedrichshafen GmbH, Friedrichshafen, Fed. Rep. of Germany

[21] Appl. No.: 413,396

[22] Filed: Aug. 31, 1982

[30] Foreign Application Priority Data

Dec. 17, 1981 [DE] Fed. Rep. of Germany ....... 3150001

[51] Int. Cl.³ .......................... F02B 37/00; F01N 7/10
[52] U.S. Cl. ......................................... 60/612; 60/323; 60/605
[58] Field of Search ................. 60/323, 605, 612, 597, 60/598; 123/52 MV

[56] References Cited

U.S. PATENT DOCUMENTS

| 4,034,561 | 7/1977 | Sakurai | 60/323 |
| 4,184,462 | 1/1980 | Hale | 60/323 |

FOREIGN PATENT DOCUMENTS

| 704677 | 5/1931 | France | 60/605 |
| 2314999 | 1/1977 | France | 60/323 |
| 70606 | 6/1946 | Norway | 60/605 |

*Primary Examiner*—Douglas Hart
*Attorney, Agent, or Firm*—Craig & Burns

[57] ABSTRACT

An exhaust manifold system for a reciprocating internal combustion engine which includes an exhaust manifold common to all of the cylinders. A turbine of at least one exhaust gas turbocharger is supplied in a ramming process, with exhaust gases from the manifold. The cylinders are disposed in two rows or banks disposed at an angle with respect to one another, with the cylinder heads being connected to the engine block at appropriate mounting surfaces. The exhaust manifold system is disposed inside the engine block in the tunnel-shaped chamber. The chamber is delimited by longitudinally extending walls of the engine block, with the walls being located in the angle between the cylinders, and by a sealing wall. The sealing wall links or connects the longitudinally extending walls together at a level of the mounting surfaces on the two banks of cylinders. The arrangement of the exhaust manifold system in this manner reduces the pollution of the environment caused by radiation of heat and noise. The energy losses in the exhaust gas are low because of the structural length of the exhaust manifold and a smaller temperature differential exists with respect to the immediate environment in contrast with previously proposed systems.

12 Claims, 3 Drawing Figures

SUPERCHARGED RECIPROCATING INTERNAL COMBUSTION ENGINE

The present invention relates to a reciprocating internal combustion engine and, more particularly, to a supercharged internal combustion engine, with the supercharging being effected by way of an exhaust gas turbocharger, and with the engine including two banks of cylinders mounted at an angle to one another, the cylinder heads being connected to the engine block along mounting surfaces, as well as an exhaust manifold system disposed between the cylinder banks, and with the arrangement providing for an operation of the turbine of the exhaust gas turbocharger in a ramming process, with exhaust gases from the manifold.

Reciprocating internal combustion engines of the aforementioned type have been proposed wherein the exhaust manifold is disposed between banks of cylinder at a level or above cylinder heads. In these proposed constructions, the exhaust manifold system is surrounded by an expensive jacket in order to reduce environmental pollution caused by radiation of heat and noise and also to maintain an energy content of the exhaust gases.

Consequently, for example, it has been proposed to provide a water-cooled jacket for exhaust manifolds; however, a disadvantage of this proposal resides in the fact that the water cooled jacket is expensive to manufacture and, additionally, the provision of such jacket increases the weight of the reciprocating internal combustion engine as well as takes up a considerable amount of additional space. The space taken up by the jacket depends primarily on the thickness of the heat insulation, whereby an effective temperature differential is critical to the dimensioning of the heat insulation.

With an arrangement of the exhaust manifold as described hereinabove, an ambient temperature corresponds to the temperature of the engine compartment so that there is a high effective temperature differential with respect to the exhaust gas temperature and, consequently, a considerable thickness of material is required to ensure the proper amount of heat insulation.

The aim underlying the present invention essentially resides in providing an arrangement for exhaust manifold system in a supercharged reciprocating internal combustion engine, which arrangement eliminates if not substantially reduces undesired pollution of the environment by radiated heat and noise.

In accordance with advantageous features of the present invention, an exhaust manifold is provided which is common to all cylinders, with a turbine of at least one exhaust gas turbocharger being supplied from the common exhaust manifold. The exhaust manifold is disposed inside the engine block in a tunnel-shaped chamber, which chamber is delimited by longitudinally extending walls of the engine block. The walls are linked together at an angle between the banks of the cylinder and by a sealing wall, with the wall linking or connecting the longitudinally extending walls together at a level of mounting surfaces on the two banks of the cylinders.

By virtue of the above-noted features of the present invention, the undesireable pollution of the environment due to radiated heat and noise from the exhaust manifold system is optimally reduced due to the encapsulation within the engine block. In the construction of the present invention the ambient temperature of the tunnel shaped chamber corresponds to operating temperatures of the reciprocating internal combustion engine so that the temperature differential with respect to the exhaust gas is less than when the exhaust manifold is located outside of the engine block. Furthermore, the energy loss from the exhaust gases on the way from the cylinder to the turbine of the exhaust gas turbocharger is reduced by virtue of the present invention so that the effectiveness of the supercharging is improved by the exhaust gas which is richer or higher in energy.

In accordance with still further features of the present invention, a cross section of the tunnel-shaped chamber, not completely filled by the exhaust manifold, advantageously serves as an exhaust manifold for the turbine exhaust. Moreover, the exhaust manifold may be surrounded by the jacket tube with a space provided between the exhaust manifold and the jacket tube.

In accordance with still further features of the present invention, an outlet of the turbine of the at least one exhaust gas turbocharger terminates in an intermediate chamber between the exhaust manifold and the jacket tube. Advantageously, an inlet of the tubine of at least one additional exhaust gas turbocharger is connected to the intermediate chamber defined between the exhaust manifold and jacket tube.

An inlet stub of an exhaust system may, in accordance with the present invention, be connected to the tunnel-shaped chamber. It is also possible for the inlet stub of the exhaust system to be connected to the intermediate chamber defined between the exhaust manifold and jacket tube.

In accordance with yet further features of the present invention, the exhaust manifold is surrounded with a heat insulating material and, likewise, the jacket tube may also be surrounded with a heat insulating material.

Insertable tubes may, in accordance with the present invention, be disposed as an exhaust guiding connection to the exhaust manifold as well as to the intermediate space defined between the jacket tube and exhaust manifold. Mounting openings may be provided and disposed in a sealing wall, with the mounting openings being closable by liquid-cooled lids or covers. The mounting openings, closable by lids or covers, may be disposed on the engine block at endwise walls of the tunnel-shaped chamber.

The advantages achieved by the aforementioned features of the present invention reside especially in the fact that an arrangement is provided which is extraordinarily advantageous from the heat engineering standpoint is provided for the exhaust manifold system. Moreover, the disposition of the exhaust gas turbocharger or turbochargers in accordance with the present invention enables the realization of an especially compact construction above the exhaust manifold on the engine block. Thus, the overall height of the supercharged reciprocating internal combustion engine may be reduced. It is also possible by virtue of the present invention to achieve a shortening of the length of the exhaust manifold between the cylinders and exhaust gas turbochargers thereby providing for a weightsaving construction.

Accordingly, it is an object of the present invention to provide a supercharged reciprocating internal combustion engine which avoids, by simple means, shortcomings and disadvantages encountered in the prior art.

Another object of the present invention resides in providing a supercharged reciprocating internal combustion engine which minimizes if not avoids the undesireable pollution of the environment by radiated heat and/or noise from the exhaust manifold system, Another object of the present invention resides in providing a supercharged reciprocating internal combustion engine which improves the overall effectiveness of the supercharging during all operating loads of the engine.

A still further object of the present invention resides in providing a supercharged internal combustion engine which reduces the temperature differential between an engine compartment accommodating the engine and the exhaust gases.

These and other objects, features, and advantages of the present invention will become more apparent from the following description when taken in connection with the accompanying drawing which shows, for the purposes of illustration only, several embodiments in accordance with the present invention, and wherein:

FIG. 1 is a partial cross sectional view of a supercharged reciprocating internal combustion engine constructed in accordance with the present invention having a single-walled exhaust manifold.

Figure 3:
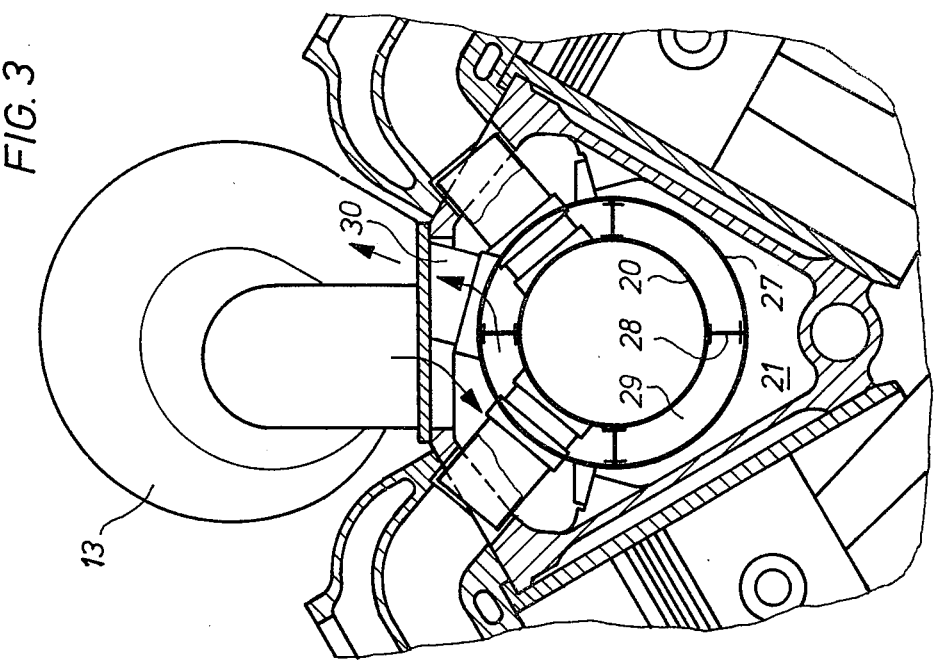
Figure 2:
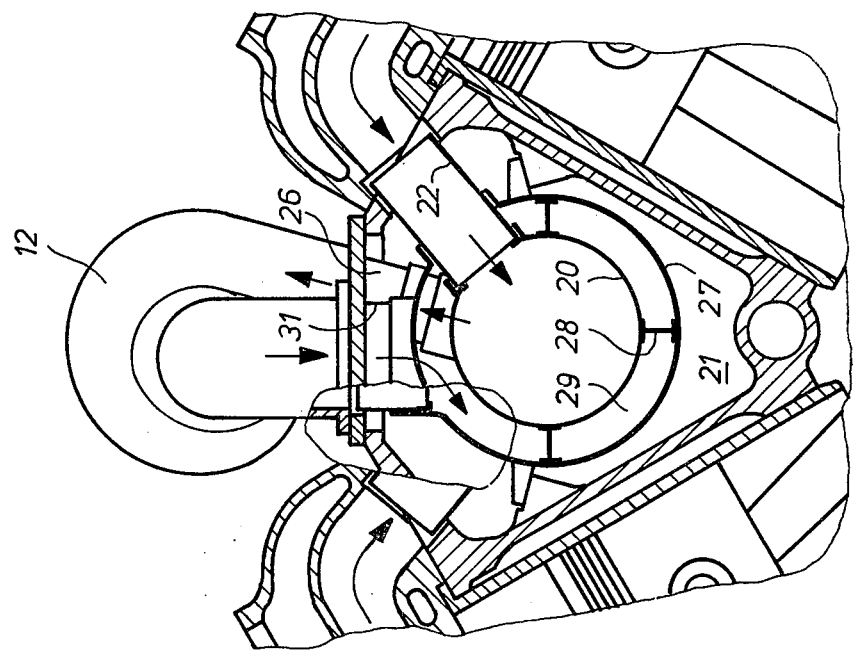

FIG. 2 is a partial cross sectional view of a supercharged reciprocating internal combustion engine constructed in accordance with the present invention, with a double-walled exhaust manifold; and FIG. 3 is a partial cross sectional view of a supercharged reciprocating internal combustion engine constructed in accordance with the present invention, with two-staged supercharging and a double-walled exhaust manifold.

Referring now to the drawings wherein like reference numerals are used throughout the several views to designate like parts and, more particularly, to FIG. 1, according to this figure, a reciprocating internal combustion engine generally designated by the reference numeral 11 is applied with precompressed boost air for supercharging by at least one exhaust gas turbocharger 12 or, as shown in FIG. 3, by a further exhaust gas turbocharger 13. The boost air flows through boost air or supercharging air lines 17 to respective cylinders of the engine 11, with the cylinders being disposed in two rows or banks at an angle with respect to one another. An individual cylinder head is associated with each cylinder or bank of cylinders and is connected or secured to an engine block at a mounting surface 16 provided on the block 15. The respective cylinder heads 14 are provided with exhaust outlet or discharge channels 18 which communicate with an opening 19 provided in the mounting surface 16 of the engine block 15. An exhaust manifold system is provided which includes an exhaust manifold 20 which is common to all of the cylinders of the engine 11. The exhaust manifold system is disposed between the banks of cylinders, within an engine block 15, in a tunnel-shaped chamber 21 and is connected by insertable tubes 22 with the exhaust outlet or discharge channels 18. The tunnel-like space 21 is delimited by longitudinally extending walls 23 of the engine block 15 and by a sealing wall 24, with the longitudinally extending walls 23 being connected together at the angle between the banks of the cylinders, and with the sealing wall 24 connecting the longitudinally extending walls 23 at a level of the mounting surfaces 16 of the rows or banks of cylinders.

Employing the principle of ram supercharging, the exhaust gas turbocharger 12 is supplied with hot exhaust gases from an insertable connection member 26 from the exhaust gas manifold 20. The exhaust gas manifold 20 may be protected by a layer of heat insulation 25. The exhaust gas, which expands in the turbine of the exhaust gas turbocharger 12, is blown or directed out into the cross section of the tunnel-shaped chamber 21, which chamber 21 is not completely filled by the exhaust gas manifold 20. A muffler assembly (not shown) of the reciprocating internal combustion engine 11 together with its accommpanying noise reducing elements (not shown) is connected to the tunnel-shaped chamber 21 which serves as an exhaust manifold.

As shown in FIG. 2, the exhaust manifold 21 may be surrounded by a jacket-shaped tube 27 with the tube 27 being spaced from an exterior surface of the exhaust manifold 21 by a plurality of supports 28 provided in the space 29 between the exhaust manifold 20 and jacket tube 27. The stream of exhaust gas is supplied or runs from the cylinder to an entrance of the turbine of the exhaust gas turbocharger 12 in the manner described hereinabove in connection with FIG. 1. However, the expanded exhaust gas is blown or driven out into the intermediate space 29 through a plug-in or insertable tube 31. With a single stage supercharging, the exhaust system (not shown) is connected to the intermediate space 29 so that the cross section of the tunnel shaped chamber 21 which is not completely filled by the exhaust manifold system remains free of exhaust gas. The jacket tube 27 may be protected along an exterior thereof by an appropriate layer of heat insulation material.

If the reciprocating internal combustion engine 11 is supercharged in two stages by, for example, connecting the two exhaust gas turbochargers 12, 13 in cascade, the exhaust gas which is partially expanded in the exhaust gas turbocharger 12 cannot enter the exhaust system from the intermediate chamber 29, but rather enters through plug-in tube 30 into the low pressure turbine of the exhaust gas turbocharger 13 and is then blown out or directed into the cross-section of the tunnel-shaped chamber 21 which is not completely filled by the exhaust manifold system. In this arrangement, the exhaust system (not shown) is connected to the tunnel-shaped chamber 21.

The tunnel-like chamber 21 is provided on its end walls with mounting openings adapted to be closed by lids or covers for enabling an installation of the exhaust manifold 20 or the exhaust manifold 20 combined with the jacket tube 27. Likewise, mounting openings are provided in closing wall 24 with the openings being closable by lids or covers, which lids or covers may be cooled by, for example, a liquid.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A reciprocating internal combustion engine with supercharging by exhaust gas turbocharger means comprising a cylinder-crankcase, two rows of cylinders disposed at an angle with respect to one another, cylinder head means connected with the cylinder-crankcase along corresponding mounting surfaces, at least one exhaust gas turbocharger means for supercharging the engine, an exhaust line system arranged between the two rows of cylinders, characterized in that the exhaust line system includes an exhaust manifold means common to all of the cylinders for supplying exhaust gases to the turbine means of the at least one exhaust gas turbocharger means, the exhaust line system being arranged within the cylinder-crankcase in a tunnel-like chamber means which is delimited by longitudinally extending walls of the cylinder-crankcase which are disposed at an angle to one another and are connected with each other along the apex of the angle, and a terminal wall means which connects with each other the longitudinally extending walls and is disposed substantially at the level of the cylinder head mounting surfaces.

2. A reciprocating internal combustion engine according to claim 1, wherein the cross section of the tunnel-like chamber means that is not filled out by the exhaust manifold means serves as an exhaust manifold for exhaust gases of the turbine means of the exhaust gas turbocharger means.

3. A reciprocating internal combustion engine according to claim 1, wherein the exhaust manifold means is surrounded by a jacket means spaced from the outside surface of exhaust manifold means to form an intermediate space.

4. A reciprocating internal combustion engine according to claim 3, wherein the outlet of the turbine means of the exhaust gas turbocharger means terminates in said intermediate space.

5. A reciprocating internal combustion engine according to claim 4, wherein at least one additional exhaust gas turbocharger means is provided, whose inlet is connected with said intermediate space.

6. A reciprocating internal combustion engine according to claim 5, wherein an inlet stub of an exhaust system of the engine is in communication with the tunnel-like chamber means.

7. A reciprocating internal combustion engine according to claim 4, wherein an inlet stub of an exhaust system of the engine is in communication with said intermediate space.

8. A reciprocating internal combustion engine according to claim 3, wherein a heat insulated material surrounds at least a portion of the jacket means.

9. A reciprocating internal combustion engine according to claim 2 wherein a heat insulating material surrounds at least a portion of the exhaust manifold means.

10. A reciprocating internal combustion engine according to one of claims 4, 5, or 7, wherein insertable tube means are provided for forming an exhaust gas connection to the exhaust manifold means and the intermediate space.

11. A reciprocating internal combustion engine according to claim 1, wherein mounting openings are provided in the terminal wall means, and wherein liquid cooled lids are provided for closing the mounting openings.

12. A reciprocating internal combustion engine according to one of claims 1 or 3, wherein wall portions on the cylinder-crankcase which form respective end faces of the tunnel-like chamber means are provided with mounting openings operable to be closed off by lids.

* * * * *